United States Patent [19]

Spiegel

[11] Patent Number: 5,488,780
[45] Date of Patent: Feb. 6, 1996

[54] AMERICAN FOOTBALL SWEET SPOT MARKING TEMPLATE

[75] Inventor: H. Jay Spiegel, Alexandria, Va.

[73] Assignee: Premium Products, Inc., Alexandria, Va.

[21] Appl. No.: 334,068

[22] Filed: Nov. 4, 1994

[51] Int. Cl.$^6$ .............................. G01B 3/14; A63B 69/00
[52] U.S. Cl. ...................... 33/562; 273/55 R; 273/183.1
[58] Field of Search .................. 33/562, 563; 273/55 R, 273/55 B, 65 R, 65 E, 183.1, 184 R, 186.4

[56] References Cited

U.S. PATENT DOCUMENTS

| 3,019,762 | 2/1962 | Hautz | 273/186.4 |
| 3,425,693 | 2/1969 | Murray | 273/65 A |
| 4,432,551 | 2/1984 | Chen | 273/186.4 |
| 5,181,325 | 1/1993 | Damon | 33/562 |

OTHER PUBLICATIONS

Washington Post, Oct. 29, 1976, "Very Little Handicaps Texas Tech's Kicker" p. D4 col. 2 lines 5+ by Paul Attner.

Primary Examiner—Christopher W. Fulton
Attorney, Agent, or Firm—H. Jay Spiegel

[57] ABSTRACT

A template having a generally rectangular opening therein which is designed to have dimensions approximating the dimensions of the "sweet spot" of an oblate spheroidal football. This template is attached to a handle at one end of the handle with the other end of the handle having an attachment member designed to engage the tip of the football. In a first embodiment of the present invention, the handle is of fixed length specifically designed so that with the attachment member engaged on the tip of the football, the handle lies closely against the surface of the seam of the football so that the template may be centered over the seam and at a distance from the tip where, through experimentation, the "sweet spot" of that particular football has been located. In a second embodiment of the present invention, the handle is made of two pieces with one piece telescoping within the other piece. Indicia are provided on one of the pieces which, when aligned with an end of the other piece, provide a combined length for the handle which locates the template at the correct location regarding the "sweet spot" of the particular football identified on the particular indicium chosen.

8 Claims, 2 Drawing Sheets

AMERICAN FOOTBALL SWEET SPOT MARKING TEMPLATE

BACKGROUND OF THE INVENTION

As is well known, the game of American football employs a football which is made in the shape of an oblate spheroid. Some aspects of the game of American football involve place kicking the football either as supported on a kicking tee or off the ground as held by a holder.

American football place kickers find, with experience, that an oblate spheroid has a "sweet spot" extending to either side of a seam thereof opposite to the seam which carries the football laces. This "sweet spot" is somewhat below a mid-point of the football and extends downwardly along the seam a short distance as well. With experience, those who place kick an American football find that when such a football is kicked by striking this "sweet spot", the football travels with optimal elevation and distance. As such, when a place kicker is learning to kick an American football, one of the lessons which must be learned is to consistently kick the "sweet spot" of the football.

Heretofore, to Applicant's knowledge, there has never been an appliance which is usable to facilitate accurate marking of the "sweet spot" of a football so that a place kicker can learn how to strike the "sweet spot" with every kick. It is with this aspect in mind that the present invention was developed.

SUMMARY OF THE INVENTION

The present invention relates to an American football sweet spot marking template. The present invention includes the following interrelated objects, aspects and features:

(A) The present invention includes a template having a generally rectangular opening therein which is designed to have dimensions approximating the dimensions of the "sweet spot" of an oblate spheroidal football.

(B) This template is attached to a handle at one end of the handle with the other end of the handle having an attachment member designed to engage the tip of the football.

(C) In a first embodiment of the present invention, the handle is of fixed length specifically designed so that with the attachment member engaged on the tip of the football, the handle lies closely against the surface of the seam of the football so that the template may be centered over the seam and at a distance from the tip where, through experimentation, the "sweet spot" of that particular football has been located.

(D) In a second embodiment of the present invention, the handle is made of two pieces with one piece telescoping within the other piece. Indicia are provided on one of the pieces which, when aligned with an end of the other piece, provide a combined length for the handle which locates the template at the correct location regarding the "sweet spot" of the particular football identified on the particular indicium chosen. In this regard, as is well known various manufacturers of oblate spheroidal footballs manufacture such footballs in slightly differing dimensions. When the dimensions of an oblate spheroidal football differ from the dimensions of another oblate spheroidal football, necessarily, the location of the "sweet spot" thereof at least slightly changes. Thus, through the use of an extensible handle and appropriate indicia, the second embodiment of the present invention may be employed to locate the "sweet spot" of any oblate spheroidal football.

(E) In either embodiment of the present invention, once the inventive marking template has been attached to the football with the opening of the template suitably aligned over the "sweet spot" of the football, a marking device such as a piece of chalk may be employed to color in the opening in the template so that when the template is removed, the "sweet spot" of the football will be suitably marked. When a kicker kicks the football as so marked, if the "sweet spot" has been struck, at least some of the chalk will have left the "sweet spot" and will have been retained on the striking surface of the kicking shoe, thereby indicating to the kicker not only that the "sweet spot" has been struck but the particular location on the shoe where the "sweet spot" was struck. With this information in hand, the kicker may improve their place kicking technique.

As such, it is a first object of the present invention to provide an American football sweet spot marking template.

It is a further object of the present invention to provide such a device including an elongated handle interconnecting a template thereof with an attachment member designed to facilitate attachment of the template over the tip of the football.

It is a yet further object of the present invention to provide such a device wherein the handle may be made telescopically adjustable.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
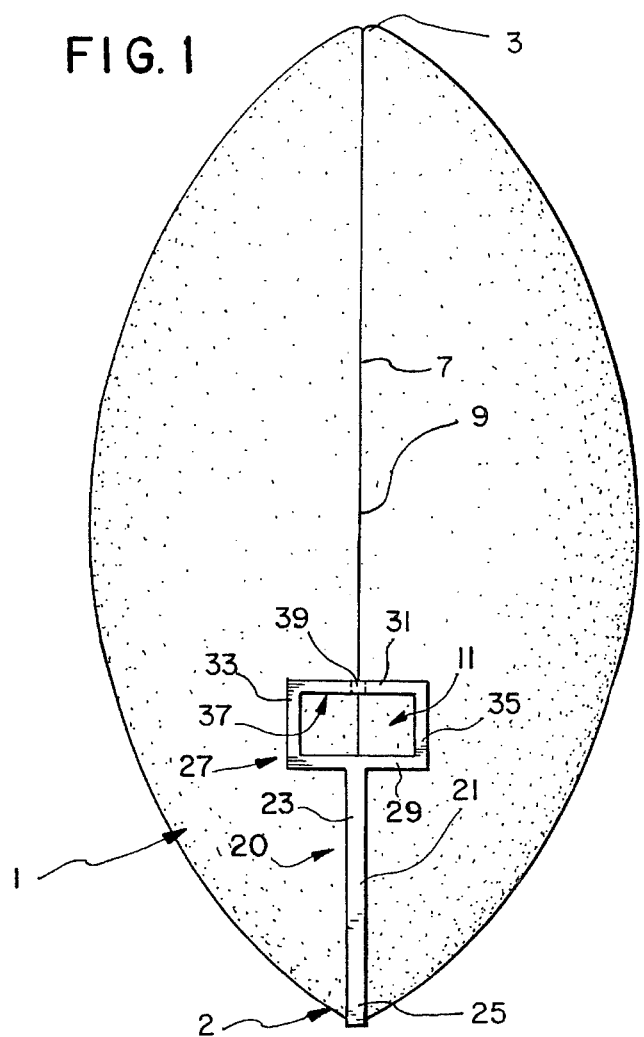
FIG. 1 shows a view of an oblate spheroidal football from the side thereof opposite to the side where the seams thereof are located, showing the present invention placed thereon.
Figure 2:
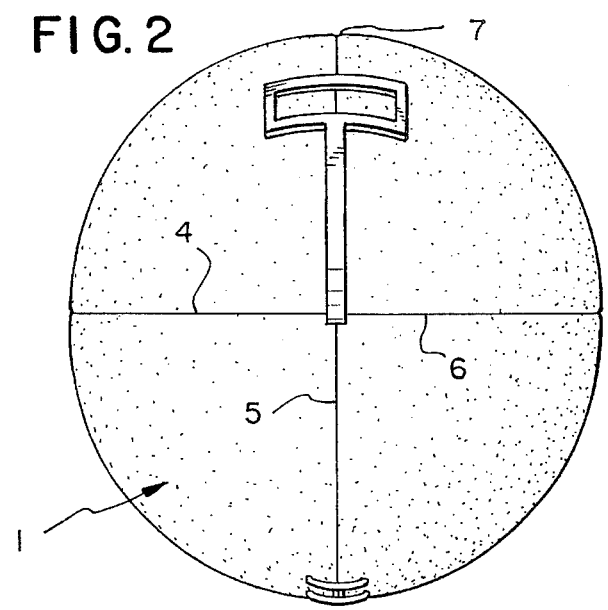
FIG. 2 shows an end view of the football shown in FIG. 1 with the inventive marking template placed thereon.
Figure 3:
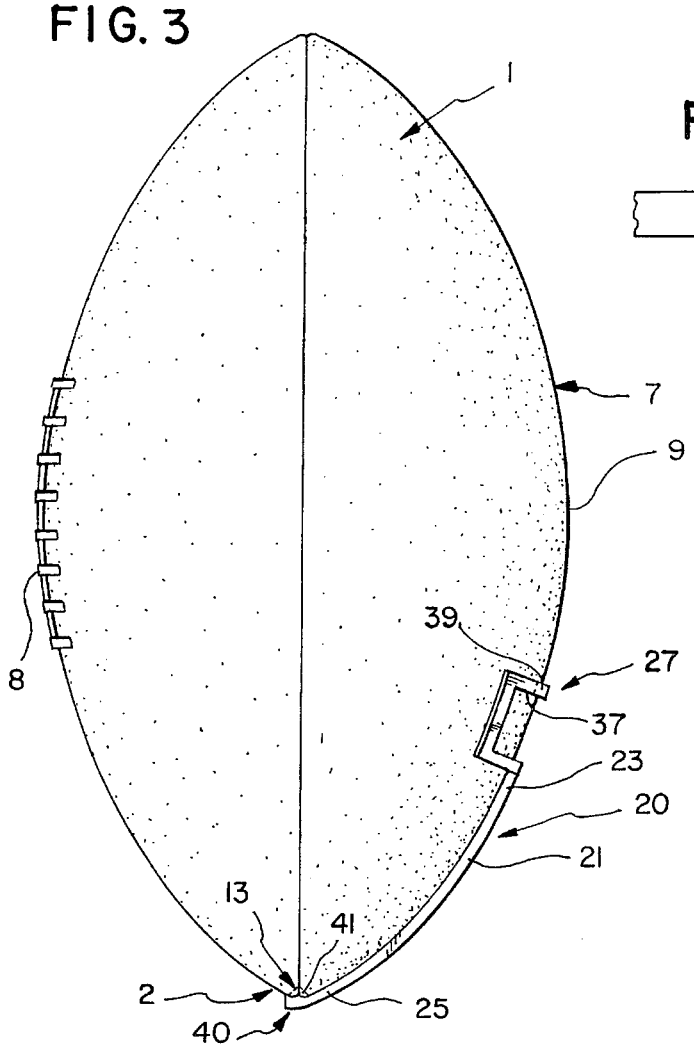
FIG. 3 shows a side view of the football as shown in FIG. 1 with the inventive marking template placed thereon.

With reference to FIGS. 1–3, an oblate spheroidal football is generally designated by the reference numeral 1 and is seen to include a tip 2, an opposite tip 3, seams 4, 5, 6 and 7, with the seam 5 having a set of laces 8 thereon. The seams 4, 5, 6 and 7 attach together the four body panels which together make up the football 1. As particularly shown in FIGS. 1 and 3, the seam 7 has a mid-point 9 half-way between the tip 2 and the tip 3.

A first embodiment of the present invention is illustrated in FIGS. 1–5. With reference to these figures, the inventive marking template 20 includes an elongated handle 21 which, as best seen in FIG. 3, is arcuate in nature, matching the arcuate curvature of the football 1. The handle 21 has a first end 23 and a second end 25.

As shown in FIGS. 1, 2 and 3, the first end 23 of the handle 21 has attached thereto a template 27 of generally rectangular configuration having a bottom wall 29, a top wall 31 and side walls 33 and 35, respectively, which walls together define an opening 37 of generally rectangular configuration. As particularly seen in FIG. 1, the top wall 31 of the template 27 is below the mid-point 9 of the seam 7 with respect to the tips 2 and 3 of the football. The opening 37 is designed to have the same shape and configuration as the "sweet spot" of the football 1. The length of the handle 21 is designed so that the opening 37, in the position shown in FIGS. 1, 2 and 3, is aligned over the "sweet spot" 11 of the football (FIG. 1). As shown in FIGS. 1 and 3, the top wall 31 of the template 27 may have a protrusion 39 on its undersurface (FIG. 3) which protrusion may have a generally triangular cross-section (not shown) so that it may enter the seam 7 to facilitate perfect alignment of the template 27 over the "sweet spot" 11 of the football 1.

Figure 4:
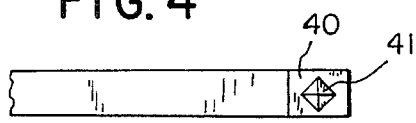
FIG. 4 shows a top view of a portion of the marking template.
Figure 5:
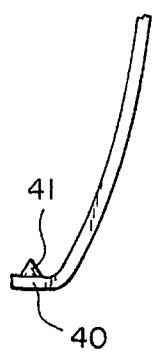
FIG. 5 shows a side view of a portion of the marking template.

With particular reference to FIGS. 3, 4 and 5, at the other end 25 of the handle 21, an attachment member 40 is provided which includes a protrusion 41 of generally triangular pyramidal shape specifically designed to enter a correspondingly shaped recess which is formed at the tip 2 of the football by the intersection of the seams 4, 5, 6 and 7.

With the first embodiment of the present invention having been described in detail, the operation thereof will now be explained.

In particular, the protrusion 41 of the attachment member 40 is inserted within the recess of the tip 2 of the football which is formed at the intersection of the seams 4, 5, 6 and 7. This recess is generally designated by the reference numeral 13 in FIG. 3. With the protrusion 41 so inserted within the recess 13, the handle 21 is laid against the surface of the football 1 along the seam 7 with the arcuate curvature of the inner surfaces of the handle 21 matching the corresponding arcuate curvature of the surface of the football 1 adjacent and at the seam 7. The protrusion 39 in the wall 31 of the template 27 enters the recess formed by the seam 7 to align the handle 21 directly over the seam 7. In this position, the opening 37 of the template 27 is perfectly aligned over the "sweet spot" of the football.

With the marking template 27 so placed, a marking device may be employed to color in the opening 37 thereby coloring over the "sweet spot" 11 of the football.

In the preferred mode of operation of the present invention, the "sweet spot" 11 is covered with chalk so that when the kicker kicks the football 1, some of the chalk will come off onto the location on the kicker's kicking shoe where the "sweet spot" 11 was struck. In this way, the kicker's kicking shoe will be marked with chalk at the exact location on the kicking shoe where the "sweet spot" was struck. Thus, through the use of the present invention, the kicker will be given information as to (1) the fact that the "sweet spot" of the football was actually struck, and (2) the location on the kicker's kicking shoe where the "sweet spot" was struck. With this information in mind, the kicker can improve their technique by adjusting the kicking stroke so that the football 1 is struck on the "sweet spot" 11 thereof and at the proper location on the kicking shoe.

Figure 6:
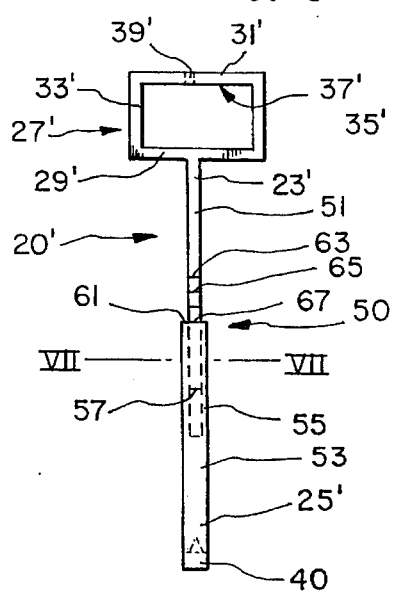
FIG. 6 shows a front view of a second embodiment of the present invention.
Figure 7:
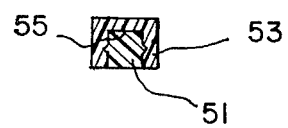
FIG. 7 shows a cross-sectional view along the line VII—VII of FIG. 6.

With reference, now, to FIGS. 6 and 7, a second embodiment of the present invention will be described using like reference numerals to denote like structures. Thus, the device illustrated in FIGS. 6 and 7 is generally designated by the reference numeral 20' and is seen to include a handle generally designated by the reference numeral 50 and comprised of a first handle portion 51 and a second handle portion 53. The first handle portion 51 has an end 23' as shown in FIG. 6 while the second handle portion 53 has an end 25' as also shown in FIG. 6. The end 23' of the handle portion 51 has attached thereto a template 27' having a bottom wall 29', a top wall 31' and side walls 33' and 35'. The top wall 31' has, on its undersurface, a protrusion 39' which is provided for the same purposes as the protrusion 39 as explained with regard to FIGS. 1–5. The walls 29', 31', 33' and 35' define therebetween an opening 37' which is sized to the approximate size of the various "sweet spots" which are found on various oblate spheroidal footballs manufactured by various manufacturers.

With reference, again, to FIGS. 6 and 7, it is seen that the handle portion 53 has a recess therein 55 as shown in phantom in FIG. 6 and within which the handle portion 51 telescopes as also seen in FIG. 7. Also shown in phantom in FIG. 6 is the end 57 of the handle portion 51.

The handle portion 53 has a top terminating edge 61 as shown in FIG. 6. Furthermore, the handle portion 51 has a series of indicia 63, 65 and 67 for a purpose to be described hereinafter.

As explained hereinabove, there are several manufacturers of oblate spheroidal footballs, including Wilson, Spalding, Rawlings and Voit. Each of these manufacturers manufactures an oblate spheroidal football in unique dimensions with each such football differing slightly in its dimensions with respect to the other footballs manufactured by other manufacturers. Thus, the respective "sweet spots" of the respective footballs are located in slightly differing locations with respect to one another. The indicia 63, 65 and 67 are provided so that one may align one indicium 63, 65 or 67 with the top termination 61 of the handle portion 53 to provide a particular length for the handle 50. Each indicium 63, 65 or 67 may be provided with appropriate information concerning one of the oblate spheroidal footballs which is manufactured so that the device 20' may be suitably extended to a length whereby the opening 37' in the template 27' thereof will be suitably aligned over the "sweet spot" of the particular football. Thus, Wilson Sporting Goods, Inc. manufactures a football known as the "NFL" and the expression "NFL" may be provided adjacent one of the indicia 63, 65 or 67. Similarly, Spalding Corporation has manufactured a football known as the "J5V" and this expression may be provided adjacent one of the indicia 63, 65 or 67. Similarly, Rawlings manufactures a football known as the "R5" and this expression may be provided adjacent one of the indicia.

The handle portions 51 and 53 are provided with the curvature shown for the handle 21 of the first embodiment of the present invention 20. Alternatively, the handle 50 may be provided by reversing the dimensions of the respective handle portions 51 and 53 so that the handle portion 53 telescopes within the handle portion 51 in the manner illustrated in FIG. 7. In either such alternative, the same intent is clear, to-wit, to locate the opening 37' of the template 27' over the "sweet spot" of the chosen football.

With further reference to FIG. 6, attached to the end 25' of the handle portion 53 is the attachment member 40 which is the same as the attachment member 40 illustrated in FIGS. 3–5, in particular.

Based upon the above description, the operation of the embodiment of FIGS. 6 and 7 should be well understood. Once the particular indicium 63, 65 or 67 is appropriately aligned with the top surface 61 of the handle portion 53, the attachment member 40 may be engaged within the recess 13 of the tip 2 of the football so that the opening 37' of the template 27' is suitably aligned over the "sweet spot" of the football. Thereafter, a suitable marking device may be employed to mark the "sweet spot" of the football.

Of course, while Applicant has disclosed the use of chalk as a marking device, for the reasons set forth hereinabove, if it is desired to provide a more permanent mark of the "sweet spot" on the football 1, other types of marking devices including the use of paint, ink, etc. may be suitably employed.

In the embodiments of the present invention, it is preferred that the inventive device be made of a suitable material such as plastic (made in an injection molding process) or rubber (made in a pressure molding process). Alternatively, if desired, the inventive device, in its embodiments, may be suitably made of wood, metal or any other suitable material.

As such, an invention has been disclosed in terms of preferred embodiments thereof, which fulfill each and every one of the objects of the invention as set forth hereinabove and provide new and useful embodiments of an American football sweet spot marking template of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A marking template comprising:
  a) an attachment member including a projection adapted to be received within a recess formed in a tip of an oblate spheroidal ball;
  b) an elongated handle having a first end attached to said attachment member; and
  c) a template attached to a second end of said handle, said template being adapted to engage a surface of an athletic ball, said template having an opening therethrough defined by template walls, said walls surrounding an area on an athletic ball when said template is adjacent an athletic ball surface;
  d) whereby a user may mark an area on an athletic ball surrounded by said walls.

2. The marking template of claim 1, wherein said elongated handle is of one-piece construction.

3. The marking template of claim 1, wherein said handle comprises a first portion telescopically mounted to a second portion whereby a length of said handle may be adjusted.

4. The marking template of claim 3, wherein said first and second portions carry cooperating indicia pertaining to particular dimensions of various sized oblate spheroidal balls whereby said handle may be extended to a desired length placing said opening over a desired area on a ball.

5. The marking template of claim 1, wherein said opening is generally rectangular, said marking template being releasably attachable over an oblate spheroidal ball having a sweet spot positionable under and in alignment with said opening and having a tip with a recess for receiving said attachment member.

6. The marking template of claim 1, wherein one of said template walls has a projection adapted to be received within a seam of a ball to align said template thereover.

7. A marking template comprising:
  a) an attachment member for removable engagement with a recess in an athletic ball;
  b) an elongated handle having a first end attached to said attachment member; and
  c) a template attached to a second end of said handle, said template being adapted to engage a surface of an athletic ball, said template having a generally rectangular opening therethrough defined by template walls, said walls surrounding an area on an athletic ball when said template is adjacent an athletic ball surface;
  d) said marking template being releasably attachable over an oblate spheroidal ball having a sweet spot positionable under and in alignment with said opening and said ball having a tip with a recess for receiving said attachment member, whereby a user may mark said sweet spot.

8. A marking template comprising:
  a) an attachment member for removable engagement with a recess in an athletic ball;
  b) an elongated handle having a first end attached to said attachment member; and
  c) a template attached to a second end of said handle, said template being adapted to engage a surface of an athletic ball, said template having an opening therethrough defined by template walls, said walls surrounding an area on an athletic ball when said template is adjacent an athletic ball surface, one of said template walls having a projection adapted to be received within a seam of a ball to align said template thereover;
  d) whereby a user may mark an area on an athletic ball surrounded by said walls.

* * * * *